US011128609B1

United States Patent
Feinberg et al.

(10) Patent No.: US 11,128,609 B1
(45) Date of Patent: Sep. 21, 2021

(54) SYSTEM AND METHOD TO IMPROVE USER AUTHENTICATION FOR ENHANCED SECURITY OF CRYPTOGRAPHICALLY PROTECTED COMMUNICATION SESSIONS

(71) Applicant: SECURE CHANNELS, INC., Irvine, CA (US)

(72) Inventors: Michael R. Feinberg, San Clemente, CA (US); Richard J. Blech, Irvine, CA (US)

(73) Assignee: Secure Channels, Inc., Irvine, CA (US)

( * ) Notice: Subject to any disclaimer, the term of this patent is extended or adjusted under 35 U.S.C. 154(b) by 142 days.

(21) Appl. No.: 16/219,746

(22) Filed: Dec. 13, 2018

(51) Int. Cl.
*H04L 29/06* (2006.01)
*H04L 9/32* (2006.01)

(52) U.S. Cl.
CPC .......... *H04L 63/061* (2013.01); *H04L 9/3247* (2013.01); *H04L 63/0435* (2013.01); *H04L 63/166* (2013.01)

(58) Field of Classification Search
CPC . H04L 63/061; H04L 63/0435; H04L 63/166; H04L 9/3247
See application file for complete search history.

(56) References Cited

U.S. PATENT DOCUMENTS

| 6,237,098 | B1* | 5/2001 | Libicki | G01G 19/02 380/277 |
| 8,352,725 | B1* | 1/2013 | O'Toole, Jr. | H04L 63/20 713/151 |
| 2004/0098590 | A1* | 5/2004 | Fausse | G06F 21/602 713/175 |
| 2013/0124860 | A1* | 5/2013 | Maidl | H04L 9/3234 713/164 |

* cited by examiner

*Primary Examiner* — Khoi V Le
(74) *Attorney, Agent, or Firm* — Rutan & Tucker, LLP

(57) ABSTRACT

A computerized method supporting SSL-based or TLS-based communications with multiple cryptographically protected transmissions is described. Responsive to a first transmission including a first content encrypted with a public key of an intended recipient and a first digital signature for use in detect tampering to the first content, a second transmission is received. The second transmission includes a combined result including the first content and a second content, which is encrypted with a public key of the sender. Recovery of the first content verifies to the sender that the second transmission originated from the intended recipient. Thereafter, a third transmission is sent. The third transmission has data including at least the second content, being the remaining data after extraction of the first content from the combined result, which is encrypted with the public key of the intended recipient and a third digital signature for use in verifying non-tampering of the data.

16 Claims, 12 Drawing Sheets

SYSTEM AND METHOD TO IMPROVE USER AUTHENTICATION FOR ENHANCED SECURITY OF CRYPTOGRAPHICALLY PROTECTED COMMUNICATION SESSIONS

EXPORT CONTROL

Information in this patent application is controlled by the U.S. Government and authorized for access only by U.S. persons and licensed non-U.S. persons. Please contact the assignee, Secure Channels, Inc, for further guidance if you wish to give access to the subject application to a non-U.S. person. This statement attaches to any use or incorporation of said patent application into other applications or any other use.

1. FIELD

Embodiments of the disclosure relate to the field of cryptography. More specifically, an embodiment of the disclosure is directed to a cryptographic communication scheme configured to provide more reliable user authentication and/or key exchange.

2. GENERAL BACKGROUND

The use of electronic data and other information has become an integral part of our daily lives. Each day, more and more emails, texts, electronic documents, and other forms of electronic data are stored and transmitted throughout the world by businesses and individuals alike. Accordingly, there exists an increasing need to protect the confidentiality of information contained within the electronic data from unauthorized disclosure and avoid man-in-the-middle attacks that are becoming more prevalent every year.

In some cases, the electronic data may include sensitive data, such as wiring instructions, bank account statements, credit card numbers, trade or government secrets, intellectual property or personally identifiable information, which has intrinsic value to both legitimate and non-legitimate actors. Encryption is one technique for protecting the confidentiality of this sensitive data from eavesdroppers or other unauthorized parties. The goal of encryption is not to hide the existence of such information, but rather, to hide its meaning and to ensure that legitimate (authenticated) person have access to the information as plaintext (e.g., non-encrypted data). Hence, encrypted data includes data that has been obfuscated according to a selected cryptographic key and cryptographic cipher. By obfuscating the data, the confidentiality is assured and the data is rendered computationally secure. That is, although an attacker may "theoretically" break a cryptographic scheme by enumerating all possible keys, the confidentiality of the data is protected when it is considered infeasible for the attacker to uncover data as plaintext from stored or transmitted ciphertext (e.g., encrypted data) in any reasonable amount of time given available computing power.

In the past, prior cryptography techniques have been configured to prevent unauthorized access to the data by third parties. One popular type of cryptographic technique involves asymmetric key cryptography such as RSA (Rivest Shamir Adleman) based cryptography. RSA-based cryptography has been widely used to support standardized security communication protocols such as Secure Socket Layer (SSL) and Transport Layer Security (TLS). SSL and TLS based communications rely on a single peer-to-peer transmission for user authentication, which involves obtaining a SSL certificate for a targeted destination to confirm that the SSL certificate is active (i.e., unexpired and unrevoked). This authentication scheme fails to conduct an analysis of results of secured communications to more precisely confirm that communications are, in fact, occurring with the targeted destination.

Furthermore, with the recent advancement of quantum computing, RSA-based cryptography up to 15-bit key lengths have been compromised. Given the wide adoption of RSA, increased exposure to any attack on RSA-based cryptography, especially as quantum computing advancements grow exponentially, is highly problematic as millions of secure communications on a daily basis could be compromised, and thus, any data transmitted over RSA-based cryptography would be suspect. While certain key lengths of RSA-based cryptosystems are still difficult to attack and bypass (e.g., 256-bit key lengths), with the advent of quantum computing and other technological advancements that increase the likelihood of successful man-in-the-middle attacks, a more reliable and secure user authentication scheme would greatly improve the longevity and continued utility of asymmetric key cryptographic schemes such as RSA.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
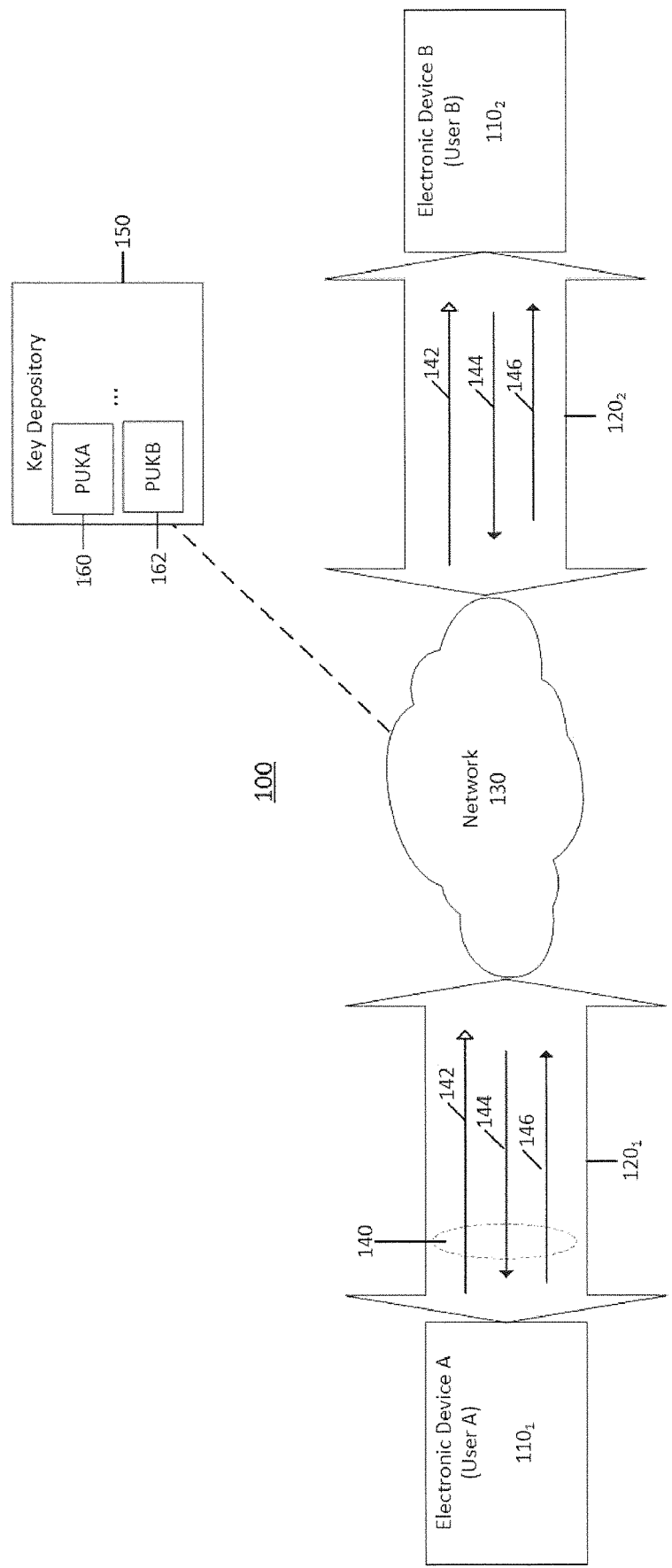
FIG. 1 is an exemplary embodiment of a communication system utilizing an improved asymmetric cryptographic communication protocol referred to as Secure Authentication and Identity Loop (SAIL).

Various embodiments of the disclosure are directed to an asymmetric cryptographic communication scheme configured to provide a more reliable user authentication and/or key exchange protocol, referred to as "Secure Authentication and Identity Loop" (SAIL). Herein, for conducting user authentication and key exchange using SAIL, both a first user (source) and a second user (destination) utilize asymmetric keys to encrypt, sign and recover content for use in securely identifying and authenticating each of the users prior to commencing a communication session. For each asymmetric key pair, a public key and a corresponding private key are mathematical inverses, and thus, are commonly generated at the same time. The public keys for a plurality of users, including the first and second users, are made publicly available, which allows the first user (source) to encrypt content directed to the second user (destination) using the second user's public key and generate a message, including the encrypted content and a corresponding digital signature, for transmission to the second user. The second user relies on its corresponding private key, where disclosure of the private key is avoided, to recover the content that was encrypted using the second user's public key.

In contrast to Secure Sockets Layer (SSL) or Transport Layer Security (TLS) based communications, the SAIL protocol features three (3) peer-to-peer cryptographically protected transmissions to identify and authenticate users. During a first cryptographically protected transmission, a first user transmits content in an encrypted form to a second user. The content may include any collection of information, including one or more images, videos, alphanumeric characters, audio, or any combination thereof. As illustrative operations of the first cryptographically protected transmission, a first electronic device associated with a first user (User A) transmits a first authentication message to a second electronic device associated with a second user (User B). Herein, the first authentication message includes encrypted content that corresponds to a first content (content_1) encrypted on a public key (PUKB) assigned to the second user (User B), as represented in FIG. 3B by the nomenclature "E[Content_1]$_{PUKB}$." Along with the encrypted content (E[Content_1]$_{PUKB}$), the first authentication message further includes a first digital signature, which is formed by digitally signing at least the encrypted content (e.g., entire encrypted content, a representation of the encrypted content such as its hash value, or a portion of the encrypted content or its hash value) with a private key (PRKA) assigned to the first user (User A). From the first authentication message, the second electronic device may determine that the encrypted content has not been tampered and recover the first content (content_1) known by the first user (User A).

For a second cryptographically protected transmission, the second user (User B) returns content in an encrypted form to the first user (User A), where the returned content may be based, at least in part, on (i) content provided by the first user (User A) in the first cryptographically protected transmission and recovered as plaintext (content_1) and (ii) additional content known exclusively by the second user (User B). Identification of the plaintext (content_1) within non-encrypted content recovered from the second cryptographically protected transmission assists in confirming communications with the second user (User B). For instance, the second electronic device may be configured to return encrypted content, where this content is a combination of the first content (content_1) and a second content (content_2) selected by the second electronic device (User B), which is encrypted with a public key (PUKA) of the first user (User A) as represented in FIG. 5B by the reference label "E[Combined Content]$_{PUKA}$." According to one embodiment of the disclosure, the "combined content" may include a concatenation of the first content (content_1) and the second content (content_2). Other embodiments of the combined content may include a result produced by a bitwise or byte wise logical operation performed between the first content and the second content (e.g., bitwise or byte wise OR, AND, XOR, etc.).

Along with this encrypted content (E[Combined Content]$_{PUKA}$), the second electronic device transmits the first digital signature, which includes at least the encrypted combined content (or a representation of the encrypted combined content) that is encrypted with a private key (PRKB) assigned to the second user (User B). Upon receipt and processing of information within the second cryptographically protected transmission, the first user (or User A) will be able to determine (i) whether the second cryptographically protected transmission is from the second user (User B) based upon successful recovery of the combined content and (ii) the first cryptographically protected transmission has been received by the second user (User B) upon the first user (User A) determining that the first content (content_1) is included as part of the combined content as shown in FIG. 6B.

Thereafter, for a third cryptographically protected transmission, the first user (User A) extracts the first content provided in the first cryptographically protected transmission sent by the first user (User A) from the combined content. As a result, only content known exclusively by the second user (User B). The return of the remaining combined content, being the second content, confirms to the second user (User B) that the first and third cryptographic communications originated from the first user (User A). For instance, the first electronic device may be configured to extract the first content (content_1) from the combined content and return the second content (content_2) encrypted with the public key of the second user (PUKB), as represented in FIGS. 6B-7B as "E[Content_2]$_{PUKB}$." Additionally, the first electronic device may also return a third digital signature including at least a portion of the encrypted second content (or a representation of the encrypted second content) encrypted with a private key (PRKA).

Upon successful receipt of the information included in the third cryptographically protected transmission, based on retrieval of the second content (content_2), the second user (User B) is able to confirm that the third cryptographically protected transmission originated from the first user (User A), given that only the first user (with the stored first content) would be able to extract the first content (content_1) from the combined content and return the second content (content_2) to the second user.

Additionally, as an optional feature, a symmetric key (SK) may be encrypted with the second content (content_2) thereby securely exchanging the symmetric key (SK) between the first electronic device and the second electronic device. Hence, in some deployments, SAIL may be used in lieu of TLS and OAuth 2 within a key exchange system that is configured to distribute one or more keys to subscribed electronic devices distributed over a network.

I. Terminology

In the following description, certain terminology is used to describe aspects of the invention. For example, in certain situations, the terms "logic" and "component" are representative of hardware, firmware and/or software that is configured to perform one or more functions. As hardware, logic (or a component) may include circuitry having data processing or storage functionality. Examples of such processing or storage circuitry may include, but is not limited or restricted to the following: a processor; one or more processor cores; a programmable gate array; an I/O controller (e.g., network interface controller, disk controller, memory controller, keyboard controller, etc.); an application specific integrated circuit; receiver, transmitter and/or transceiver circuitry; semiconductor memory; combinatorial logic, or combinations of one or more of the above components.

Logic (or a component) may be in the form of one or more software modules, such as executable code in the form of an operating system component, an executable application, firmware, an application programming interface (API), one or more subroutines, a function, a procedure, an applet, a plug-in, a servlet, a Component Object Model (COM) object, a routine, source code, object code, a shared library/dynamic linked library, a script, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of a "non-transitory storage medium" may include, but are not limited or restricted to a programmable circuit; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or portable memory device; and/or certain semiconductor memory. As firmware, the executable code is stored in persistent storage.

For this disclosure, a "user" may be construed as an electronic device involved in a communication session for user authentication and/or an individual in control of the electronic device. An "electronic device" generally refers to a computing device with network accessibility via a network interface (e.g., a network interface controller, wireless transceiver, memory controller, a physical or logical port, etc.). Examples of a computing device may include, but are not limited or restricted to the following: a server; a router or other signal propagation networking equipment (e.g., a wireless or wired access point); a set-top box; a video-game console; an endpoint device (e.g., a stationary or portable computer including a desktop computer, laptop, electronic reader, netbook or tablet; a smart phone; or wearable technology such as a Fitbit® fitness wristband, or other sensor-based component); or a virtual device with similar functionality.

The term "ciphertext" includes information, data or any other content in an encrypted format. Similarly, the term "plaintext" refers generally to information, data or any other content in an unencrypted format, which may be included as part of a message or recovered after decryption of corresponding ciphertext. In a stored format, the plaintext is sometimes referred to as "cleartext." A "message is information that is stored or transmitted in accordance with a prescribed format, which may include one or more packets or frames, a file, or any collection of bits grouped in the prescribed format.

The term "interconnect" is a physical or logical communication path to or within an electronic device. For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "computerized" generally represents that corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" may mean any of the following: "A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and is not intended to limit the invention to the specific embodiments shown and described.

II. General System Architecture

Referring to FIG. 1, an exemplary embodiment of the general architecture of a communication system 100 utilizing an improved asymmetric cryptographic communication scheme configured to provide a more reliable user authentication and/or key exchange, referred to as "Secure Authentication and Identity Loop" (SAIL), is shown. Herein, the communication system 100 includes one or more electronic devices $110_1$-$110_N$ (N≥1), which are communicatively coupled to a network 130 via interconnects $120_1$-$120_N$. As shown, a first electronic device $110_1$ may be configured to exchange one or more cryptographically protected transmissions 140 with a second electronic device $110_1$. This message exchange scheme features three (3) successive peer-to-peer cryptographically protected transmissions 140, represented by transmissions 142, 144 and 146 propagating over the network 130, to collectively identify and authenticate the source (User A) and targeted destination (User B) prior to subsequent secure communications that may include sensitive data (e.g., personally identifiable information. sensitive data such as financial records, etc.). User A may include the first electronic device $110_1$ and/or an individual utilizing the first electronic device $110i$. User B may include the second electronic device $110_2$ and/or an individual utilizing the second electronic device $110_2$.

Additionally, a key depository 150 is an electronic device that is communicatively coupled to the network 130 and permits any of the electronic devices $110_1$ . . . and/or $110_N$ to register with and publish its asymmetric public key. Unlike a certificate authority that manages the authenticity of the stored certificates, the key depository 150 maintains the public keys for registered electronic devices and/or its users. As shown, a first user (User A) $110_1$ is associated with a first public key (PUKA) 160 that is stored within the key depository 150. Similarly, a second public key (PUKB) 162 associated with the second user (User B) $110_2$ is stored within the key depository 150. Hence, the first electronic device $110_1$ is able to retrieve PUKB 162, and the second electronic device $110_2$ is able to retrieve PUKA 160, as shown in FIGS. 3B-4B.

Figure 2:
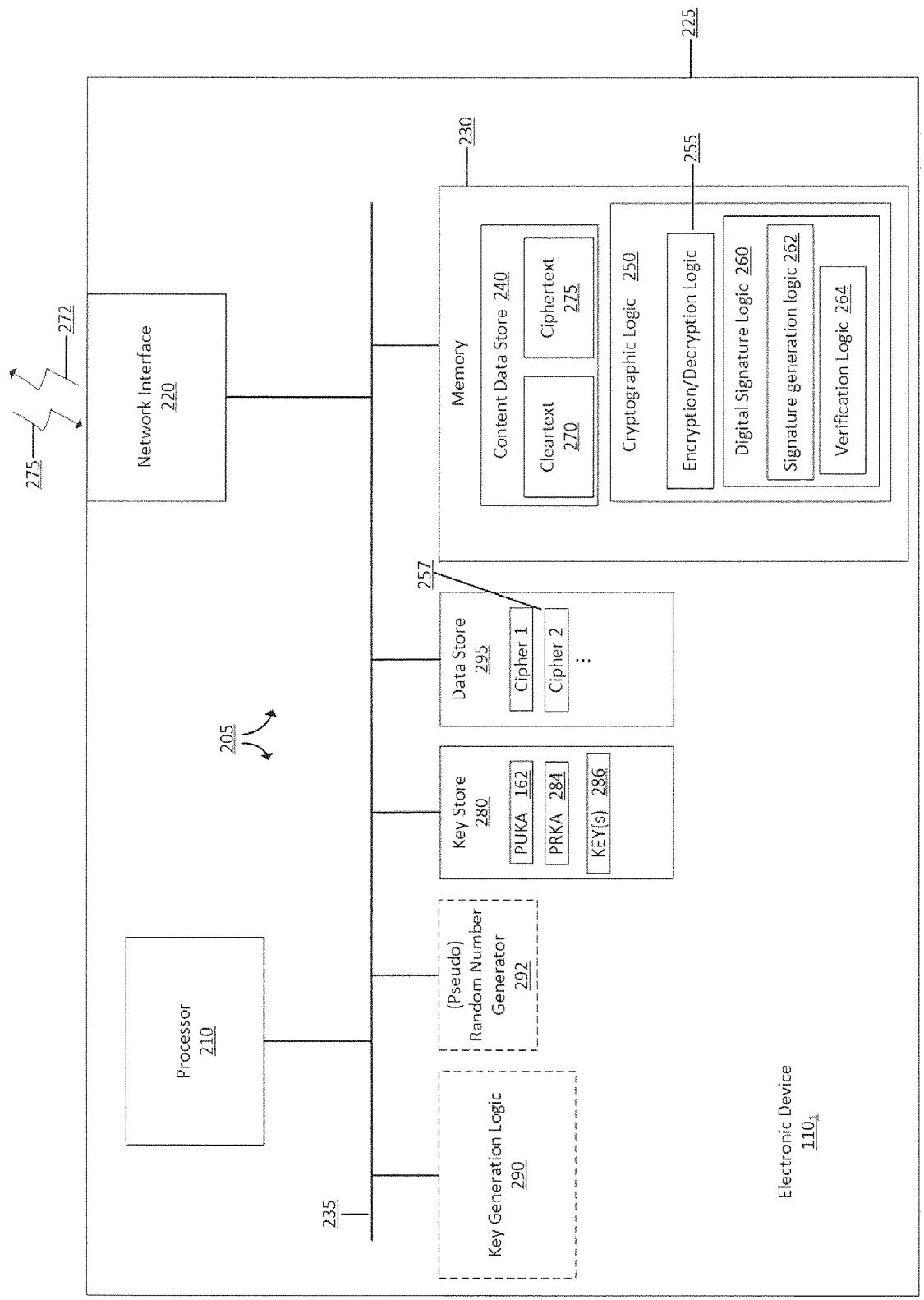
FIG. 2 is an exemplary block diagram of a general architecture of the first electronic device of FIG. 1 operating as part of the communication system.

Referring now to FIG. 2, an exemplary block diagram of a general architecture of an electronic device (e.g., the first electronic device $110_1$) operating as part of the communication system 100 of FIG. 1 is shown. Herein, the electronic device $110_1$ includes a plurality of components 205 including, but not limited or restricted to the following: a processor 210, a network interface 220, and/or a memory 230. The components 205 are communicatively coupled together via an interconnect 235. When the first electronic device $110_1$ is deployed as a physical device, the components 205 may be at least partially encased in a housing 225 made entirely or partially of a rigid material (e.g., hardened plastic, metal, glass, composite, or any combination thereof) to protect these components 205 from environmental conditions. The network interface 220 operates to provide information originating outside of the housing 225 to the components 205 deployed within the housing 225.

The processor 210 may be implemented as a multi-purpose, programmable component that accepts digital data as input, processes the input data according to stored instructions, and provides results as output. One example of the processor 210 may include a central processing unit (CPU) with a corresponding instruction set architecture. Alternatively, the processor 210 may include a digital signal processor (DSP), graphics processing unit (GPU), an Application Specific Integrated Circuit (ASIC), a field-programmable gate array (FPGA), a microcontroller, or any other electronic circuitry that is configured to support data processing.

As shown in FIG. 2, the processor 210 is communicatively coupled to the memory 230 via the interconnect 235. According to one embodiment of the disclosure, the memory 230 may correspond to persistent storage and/or non-persistent storage. As shown, the memory 230 may include (i) a content data store 240 and (ii) cryptographic logic 250, which includes encryption/decryption logic 255 and digital signature logic 260. The content data store 240 may be configured to store cleartext 270 (e.g., content stored in a non-encrypted format) and/or ciphertext 275 (e.g., content in an encrypted format) received via the network interface 220 for temporary storage in the content data store 240 as shown (or stored as cleartext or re-encrypted to prevent access to the cleartext version of the ciphertext 275).

As further shown in FIG. 2, the cryptographic logic 250 includes encryption/decryption logic 255, which is configured to (i) encrypt cleartext 270 retrieved from the content data store 240 to produce ciphertext 272 for transmission from the electronic device $110_1$ via the network interface 220 and/or (ii) receive the ciphertext 275 (encrypted content) via the network interface 220 for temporary storage in the content data store 240 as shown and/or for subsequent decryption.

In performing cryptographic operations, the encryption/decryption logic 255 has access to protected, persistent memory operating as a key store 280, which includes one or more asymmetric keys (e.g., asymmetric keys directed to the electronic device $110_1$ such as PUKA 160, PRKA 284, etc.), which may be produced by a key generation logic 290 based on a value produced by a number generator 292. The number generator 292 may correspond to a pseudo random number generator or a random number generator. The key store 280 may further include one or more asymmetric keys 286 utilized by one or more third parties such as third-party public keys directed to electronic devices (or users of these electronic devices) retrieved from the key depository 150 of FIG. 1.

The encryption/decryption logic 255 may be communicatively coupled to a data store 295 including one or more cryptographic cipher(s) 257 for use in encrypting content (generating ciphertext) in accordance with a particular cipher and recovering the content in non-encrypted format. The cryptographic cipher(s) 257 may include a single cryptographic cipher or a cipher suite including multiple ciphers that provides flexibility in the use of certain ciphers based on customer preference, type of application being used to generate the ciphertext 272 for transmission, or geographic regulations.

The digital signature logic 260 is configured with signature generation logic 262, which is configured to generate a digital signature to accompany the encrypted content (ciphertext) 272 as part of an authentication message being part of a cryptographically protected transmission. The digital signature logic 260 is further configured with verification logic 264 to perform verification operations on content within a digital signature received as part of an incoming cryptographically protected transmission to confirm origination of the transmission from a user (e.g., User B) and recover contents with the digital signature to verify the encrypted contents have not been tampered.

III. Secure Authentication and Identity Loop (SAIL) Operations

According to one embodiment of the disclosure, a multi-stage, cryptographic message exchange is conducted between a plurality of electronic devices to identify and authenticate users of the electronic device to further mitigate man-in-the-middle attacks through a more robust authentication scheme while maintaining the workflow of TLS. As described herein, a first user (User A) wants to securely communicate with a targeted second user (User B) independent of whether both User A and User B have previously met. Operating in accordance with SAIL, the first user (User A) securely identifies herself to a second user (User B), where User B authenticates User A. User B also securely identifies himself to User A and User A authenticates User B. These message exchanges provide a secure two-way authentication and identify a confirmation process to protect against a man-in-the-middle attacks. In doing so, both User A and User B would be able to securely and verifiably obtain public keys.

Figure 3A:
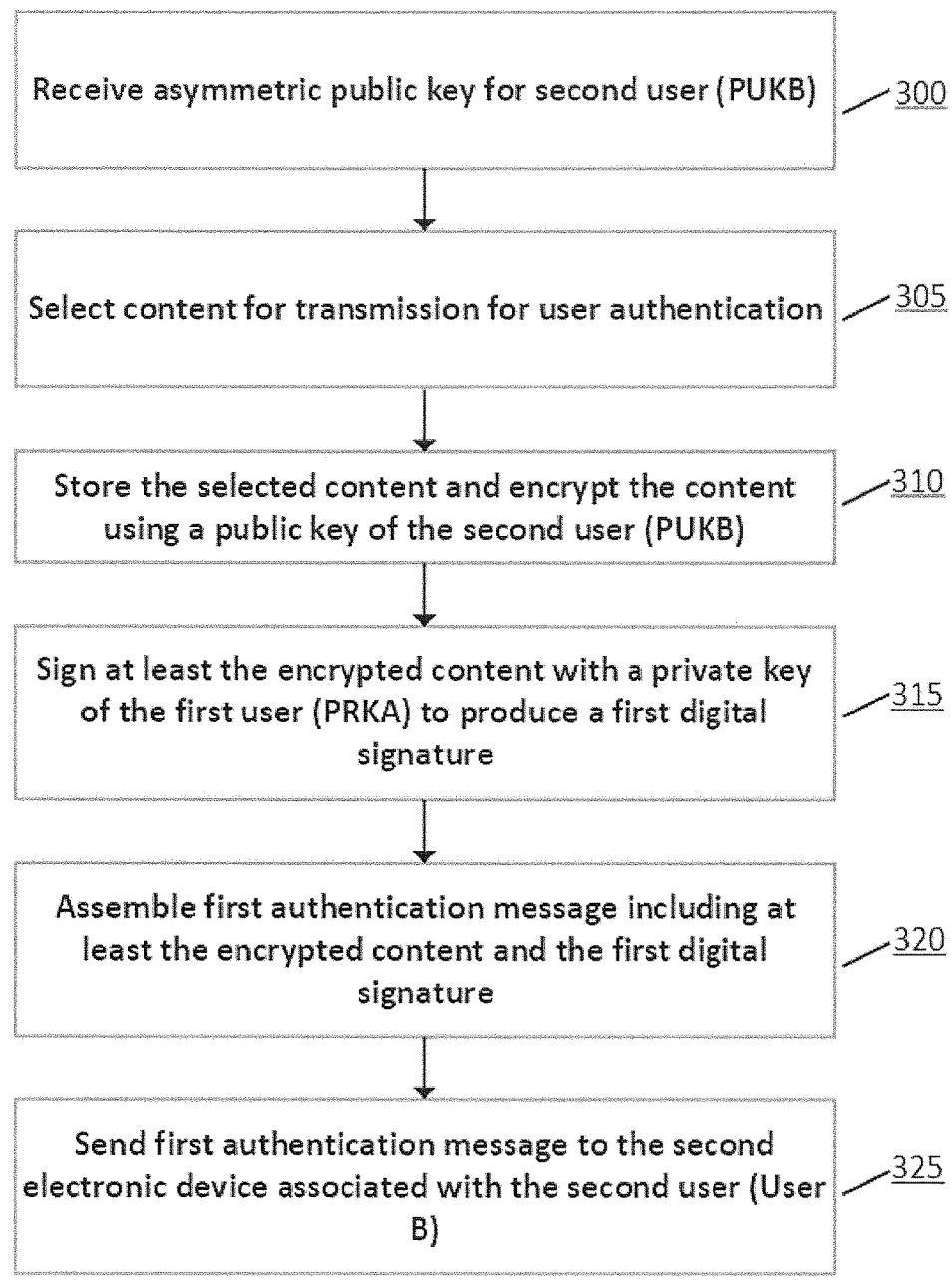
FIG. 3A is an exemplary embodiment of a first cryptographically protected transmission in accordance with the SAIL protocol.
Figure 3B:
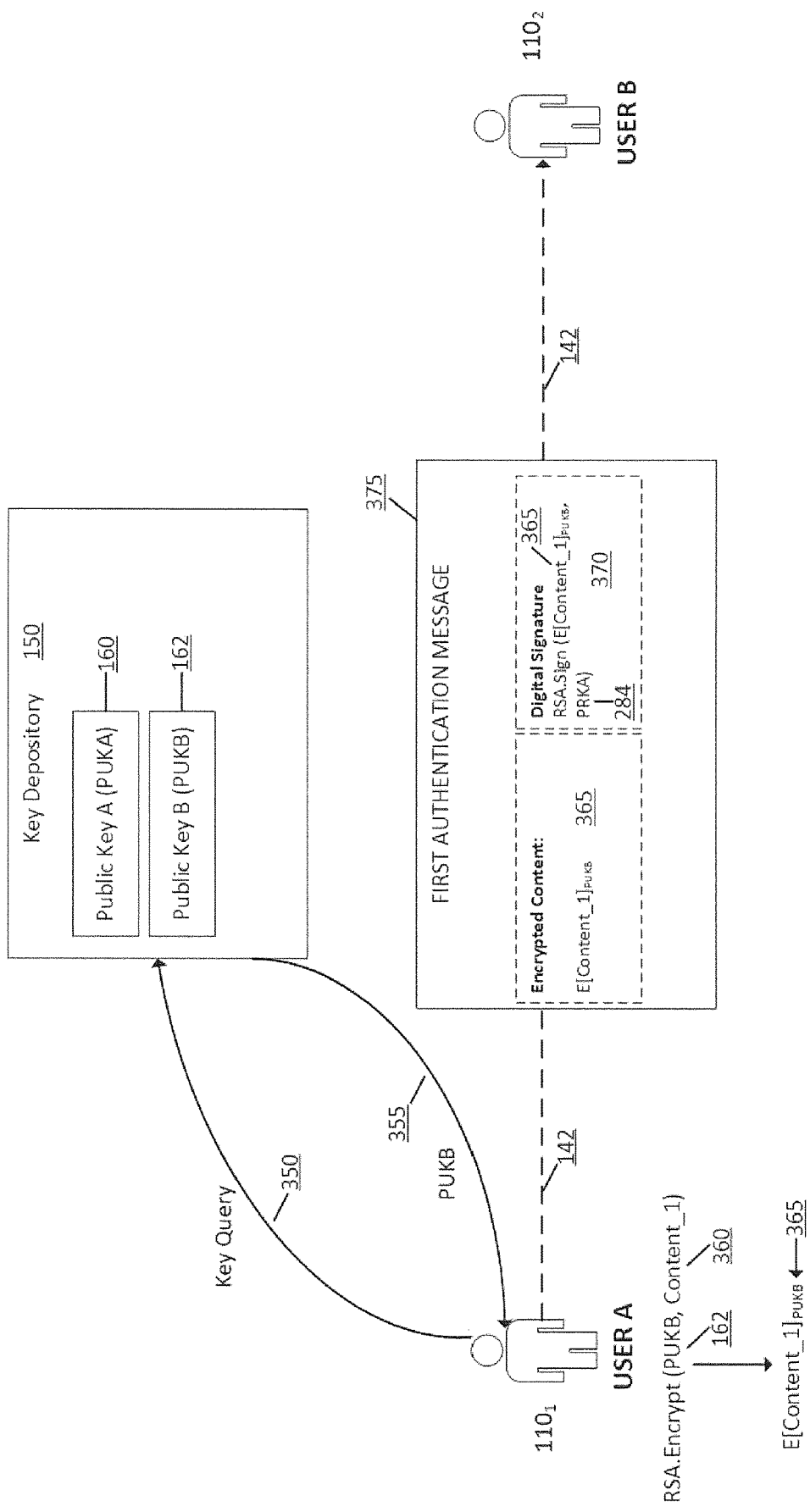
FIG. 3B is an illustrative diagram of the first cryptographically protected transmission as shown in FIG. 3A.

Referring now to FIG. 3A, an exemplary embodiment of a first cryptographically protected transmission 142 of a multi-stage, cryptographic message exchange (referred to as "SAIL") protocol is described. Initially, a first user (User A) receives an asymmetric public key associated with a second user (User B) to which User A desires to establish a secure communication session (block 300). Hence, the User A initiates a first cryptographically protected transmission by formulating a first authentication message directed to the second user (User B). In particular, the first user (User A) selects content to be included as part of the first cryptographically protected transmission, where the content is temporarily stored within the first electronic device and encrypted by logic within the first electronic device using the public key of second user (blocks 305 and 310). Additionally, the encrypted content (e.g., entire encrypted content, a representation of the encrypted content such as its hash value, or a portion of the encrypted content or hash value) is signed with a private key of the first user (PUKA) to generate a first digital signature (block 315). The encrypted content and the first digital signature are included as part of a first authentication message output from the first electronic device, which is provided as part of the first cryptographically protected transmission to a second electronic device associated with the second user (blocks 320 and 325).

Referring now to FIG. 3B, an illustrative diagram of the first cryptographically protected transmission 142 outlined in FIG. 3A is shown. Herein, the key depository 150 is accessible to obtain asymmetric public keys for use in securing communications between two users. As shown, the first electronic device $110_1$ associated with a first user (User A) initiates a key query message 350 to the key depository 150 to request a public key of a targeted user (User B) to which User A desires to establish a secure communication session. The public key for User B, namely "PUKB 162," is included as part of a key response message 355 returned to the first electronic device $110_1$ from the key depository 150. Thereafter, the encryption/decryption logic within the first electronic device $110_1$ is configured to encrypt content 360 intended to be provided to User B (referenced as "Content_1 360") using PUKB 162 to produce encrypted content 365. The encrypted content 365 is referenced in FIG. 3B as "E[Content_1]$_{PUKB}$" 365.

Along with the encrypted content (E[Content_1]$_{PUKB}$) 365, the first electronic device $110_1$ transmits a first digital signature 370 including at least the encrypted content 365 (e.g., entire encrypted content 365, a representation of the encrypted content 365 such as its hash value, or a portion of the encrypted content 365 or hash value) encrypted with a private key (PRKA) 284 assigned to the first user (User A). The first digital signature 370, referenced in FIG. 3B as "RSA.Sign(E[Content_1]$_{PUKB}$, PRKA)," may be used to determine that the encrypted content has not been tampered and to recover the first content (content_1) selected by the first user (User A). The encrypted content 365 and the first digital signature 370 form a first authentication message 375 being part of the cryptographically protected transmission 142 provided to the second electronic device $110_2$ associated with User B.

Figure 4A:
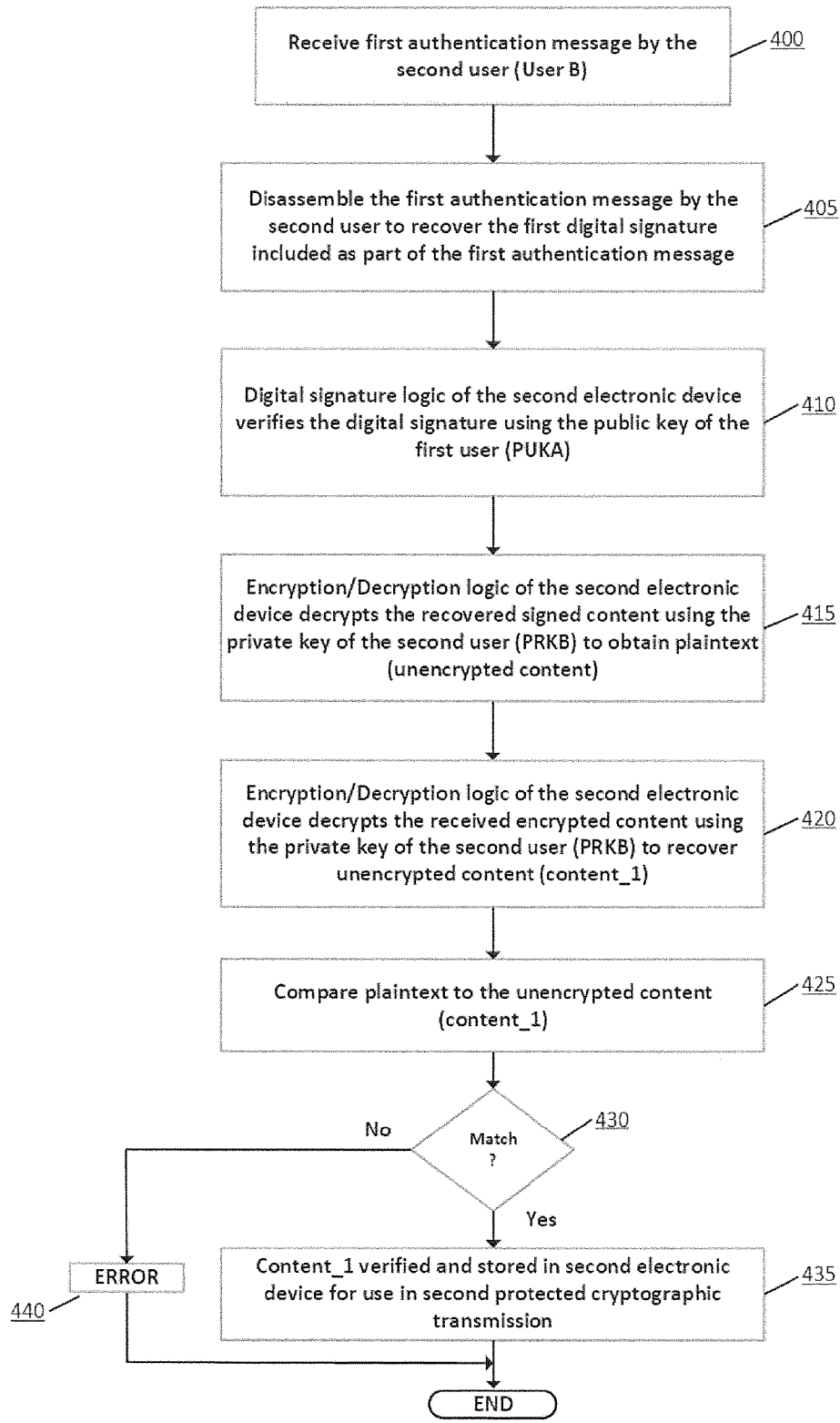
FIG. 4A is an exemplary embodiment of the recovery and authentication of content provided in the first cryptographically protected transmission in accordance with the SAIL protocol.

Referring to FIG. 4A, an exemplary embodiment of recovery and authentication of content (content_1) provided in the first cryptographically protected transmission 142 according to the SAIL protocol is described. Upon receipt of the first authentication message 375 of FIG. 3B, the second user (User B) disassembles the first authentication message to recover the first digital signature and the encrypted content (blocks 400 & 405). Using the public key of the first user (PUKA), the cryptographic logic within the second electronic device verifies the first digital signature by recovering the signed content from the first digital signature and comparing the recovered signed content to the encrypted content that accompanies the digital signature (block 410). This verification may involve the cryptographic logic of the second electronic device recovering the signed content from the digital signature using the public key of the first user (PUKA). For this embodiment of the disclosure, the recovered signed content should match the encrypted content.

Thereafter, using the private key (PRKB) of the second user (User B), the cryptographic logic of the second electronic device may decrypt the recovered signed content to obtain plaintext (unencrypted content) therefrom (block 415). Conducted with the operations for obtaining the plaintext, the cryptographic logic of the second electronic device may be configured to further decrypt the received encrypted content using the private key (PRKB) to recover the unencrypted content (content_1), which may be compared to the plaintext (blocks 420 and 425). If there is a match is detected (e.g., a correlation is greater than a prescribed threshold), the content_1 has been verified and is stored within the second electronic device for use in the second cryptographically protected transmission as described in FIGS. 5A-5B (blocks 430 and 435). Otherwise, an error condition is detected (block 440).

Figure 4B:
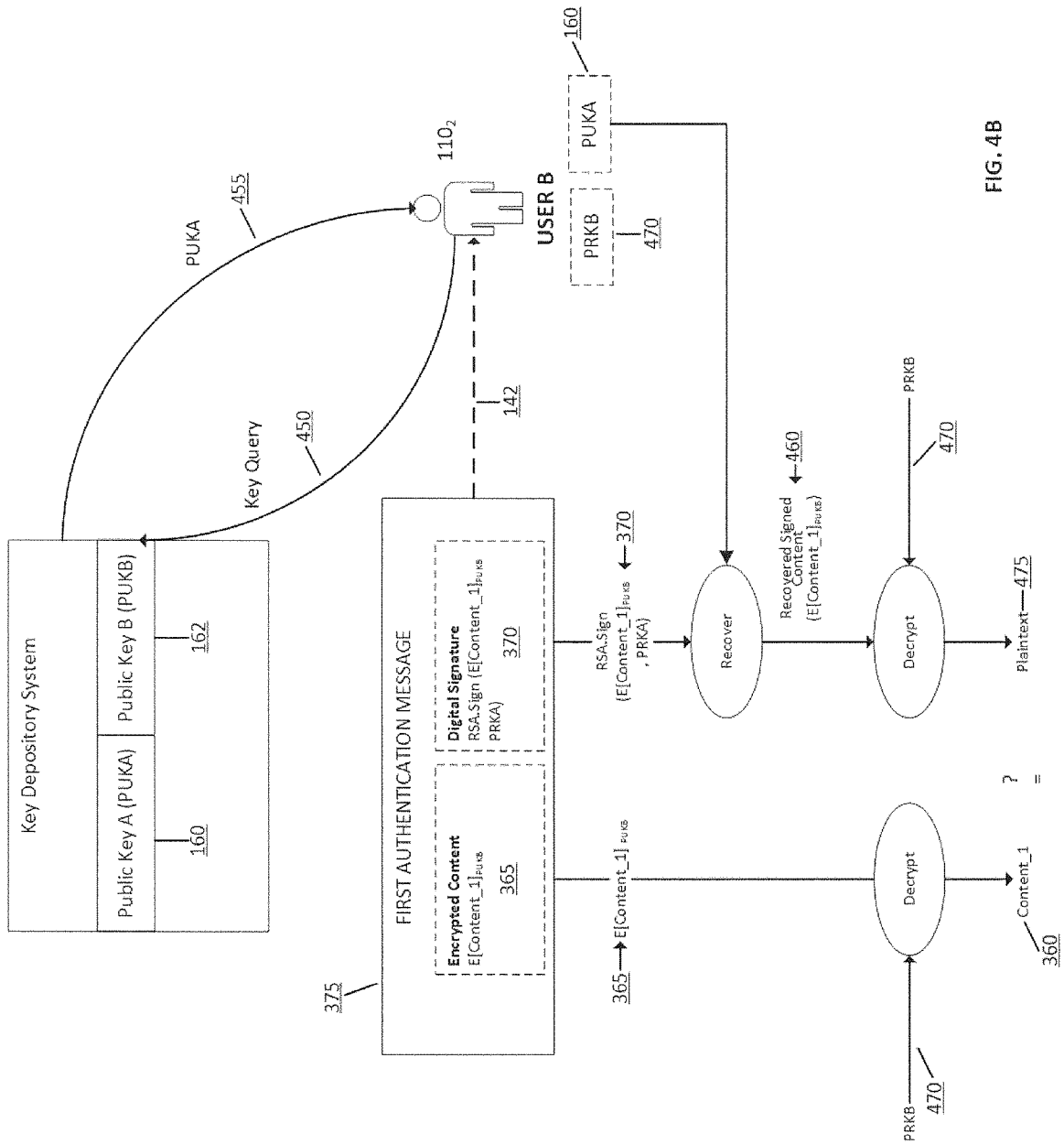
FIG. 4B is an illustrative diagram of the recovery and authentication of the content recovered from the first cryptographically protected transmission as shown in FIG. 4A.

Referring now to FIG. 4B, an illustrative diagram of the recovery and authentication of the content (content_1) recovered from the first cryptographically protected transmission 142 also illustrated in FIG. 3B is shown. Herein, the first authentication message 375 is received by the second electronic device $110_2$ associated with User B. Additionally, in some cases subsequent to receipt of the first authentication message 375, the second electronic device $110_2$ associated with the second user (User B) initiates a key query message 450 to the key depository 150 to request a public key 162 of User A. The public key for User A, namely "PUKA 160," is included as part of a key response message 455 returned to the second electronic device $110_2$ from the key depository 150. Thereafter, digital signature logic within the second electronic device $110_2$ is configured to verify the digital signature 370 by recovering the signed content (E[Content_1]$_{PUKB}$) 460 of the digital signature (RSA.Sign (E[Content_1]$_{PUKB}$, PRKA)) 370. The encryption/decryption logic within the second electronic device $110_2$ is further configured, using the private key of User B (PRKB) 470 to recover plaintext content 475 from the signed content (E[Content_1]$_{PUKB}$) 460.

Additionally, the cryptographic logic within the second electronic device $110_2$ may be configured to gain access to and decrypt the encrypted content (E[Content_1]$_{PUKB}$) 365 provided by the first authentication message 375. The encryption/decryption logic within the second electronic device $110_2$ decrypts the encrypted content (E[Content_1]$_{PUKB}$) 365 using the private key of the User B (PRKB) 470 to obtain the unencrypted content (Content_1) 360. The unencrypted content (Content_1) 360 may be compared with the recovered plaintext 475, and if there is a match (or a correlation is greater than a prescribed threshold), the content_1 has been verified and is stored within the second electronic device $110_2$ for use in the second cryptographically protected transmission as described in FIGS. 5A-5B.

Figure 5A:
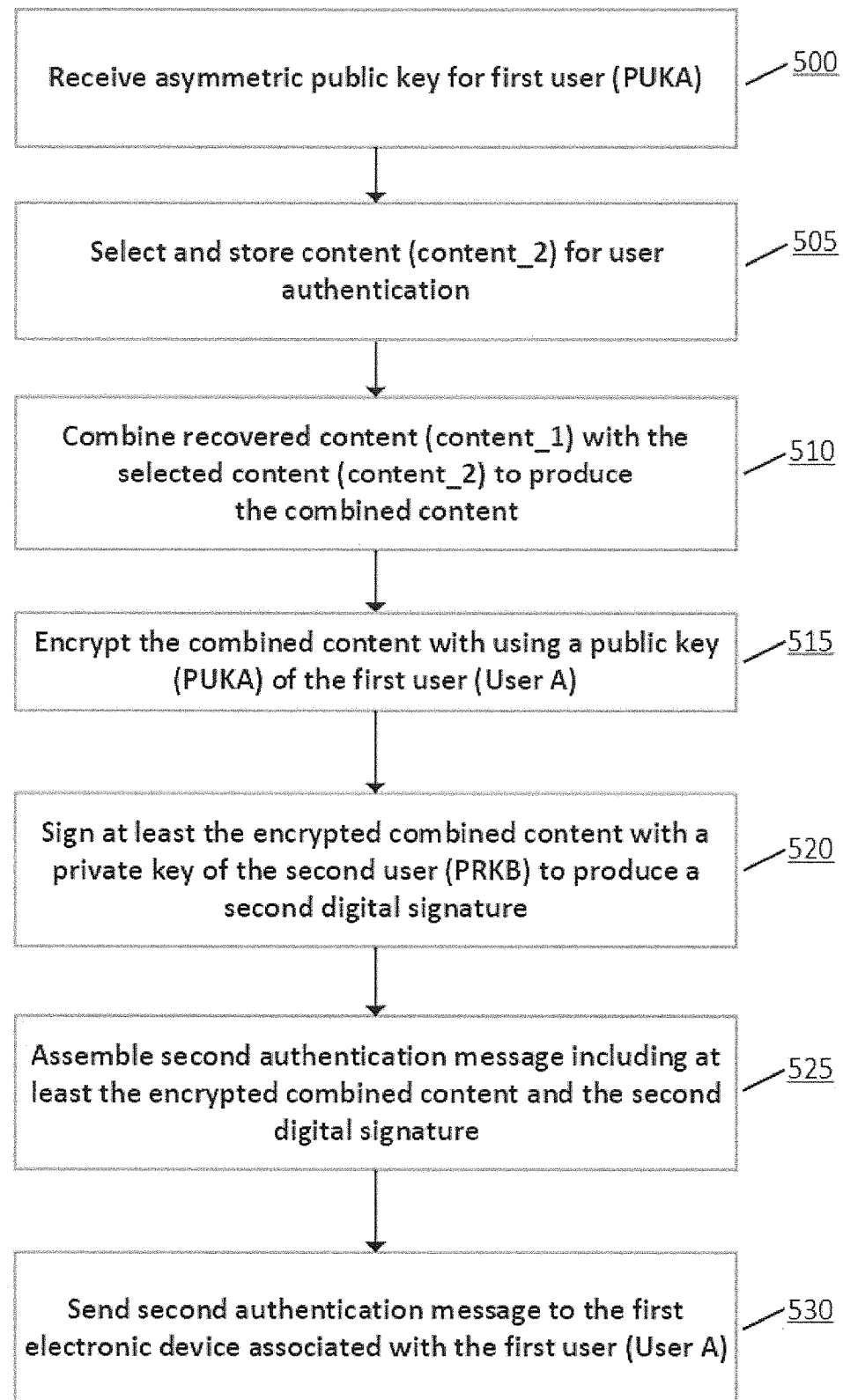
FIG. 5A is an exemplary embodiment of a second cryptographically protected transmission in accordance with the SAIL protocol.
Figure 5B:
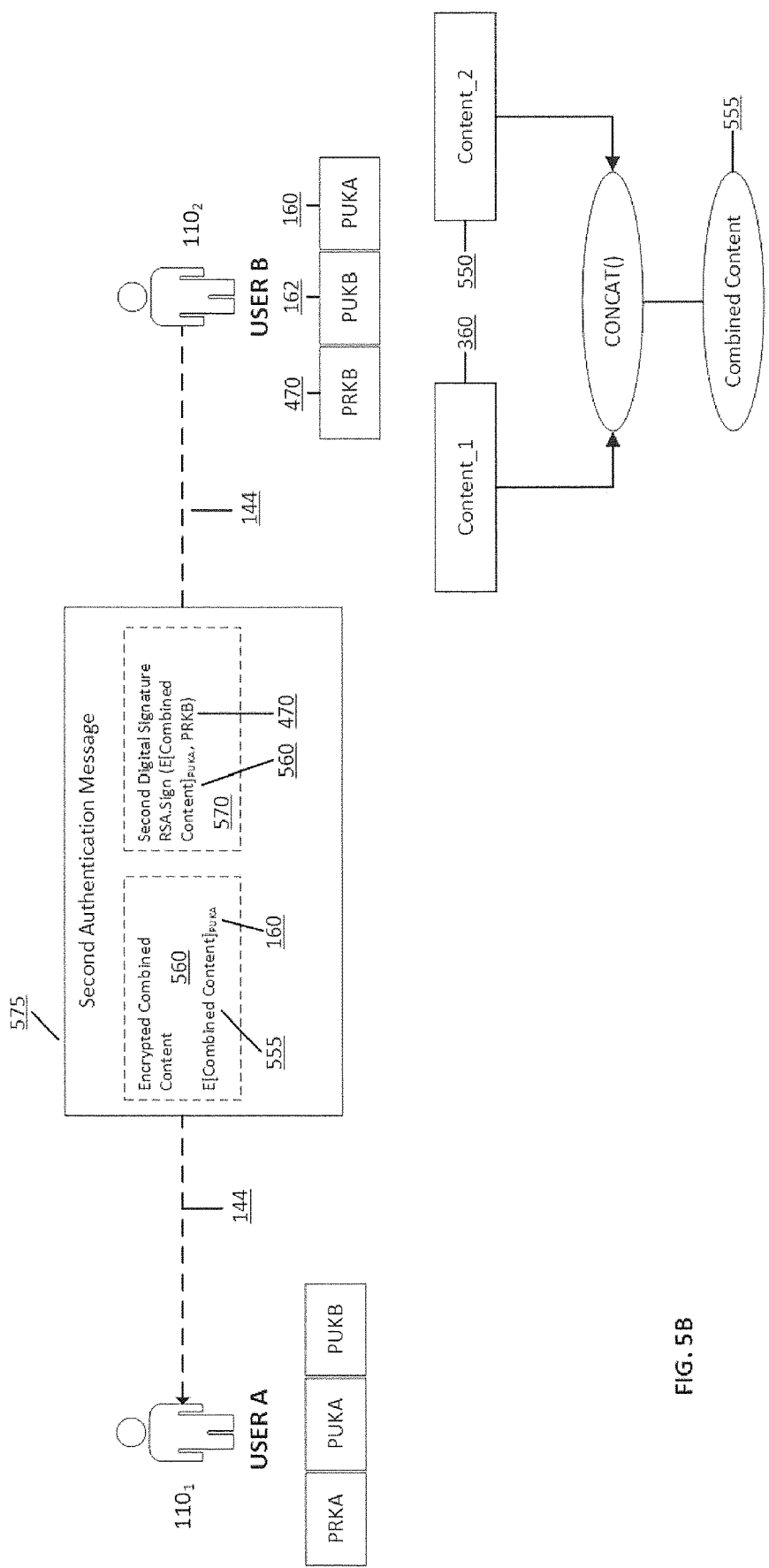
FIG. 5B is an illustrative diagram of the second cryptographically protected transmission of FIG. 5A.

Referring now to FIG. 5A, an exemplary embodiment of a second cryptographically protected transmission 144 in accordance with the SAIL protocol is described. Initially, as described above, the second user (receiver) obtains the asymmetric public key (PUKA) associated with the first user (User A), which is targeted to receive the second cryptographically protected transmission in response to the first cryptographically protected transmission of FIGS. 3A-3B (block 500). The second user (User B) selects and stores content for use in user authentication, which is referred to as "content_2" (block 505). The second user (User B), in particular logic within the second electronic device, combines the recovered unencrypted content (content_1) with the selected content (content_2). According to one embodiment of the disclosure, the combination may be a concatenation of content_1 and content_2 to produce a combined content (block 510).

Thereafter, the combined content is encrypted by cryptographic logic within the second electronic device using the public key (PUKA) of the first user (block 515). Additionally, the encrypted combined content (e.g., entire encrypted combined content, a representation of the encrypted combined content such as its hash value, or a portion of the encrypted combined content or its hash value) may be signed with a private key of the second user (PRKB) to generate a second digital signature (block 520). The encrypted combined content and the second digital signature are included within a second authentication message being part of the second cryptographically protected transmission 144 provided from the second electronic device to the first electronic device associated with the first user (blocks 525 and 530).

Referring now to FIG. 5B, an illustrative diagram of the second cryptographically protected transmission 144 described in FIG. 5A is shown. Herein, in preparation of the second cryptographically protected transmission 144 from the second electronic device 110₂ to the first electronic device 110₁, the second electronic device 110₂ generates the combined content 555, which is a combination of the first content (content_1) 360 with the second content (content_2) 550 selected by User B. For example, as shown, the combined content 555 may correspond to a concatenation of the second content (content_2) 550 with the first content (content_1) 360. As another example, however, the combined content 555 may correspond to a logical byte wise or bitwise aggregation of the first content (content_1) 360 and the second content (content_2) 550.

After generation, the cryptographic logic within the second electronic device 110₂ encrypts the combined content 555 using the public key of the first user (PUKA) 160 to produce a second encrypted content 560. Additionally, the second encrypted content 560 (e.g., entire encrypted combined content 560, a representation of the encrypted combined content 560 such as its hash value, or a portion of the encrypted combined content 560 or its hash value) is signed with the private key of the receiver (PRKB) 470 to generate a second digital signature 570. The second encrypted content 560 and the second digital signature 570 are included as part of a second authentication message 575, which is provided as part of the second cryptographically protected transmission 144 output from the second electronic device 110₂ to the first electronic device 110₁ associated with the first user (User A).

Figure 6A:
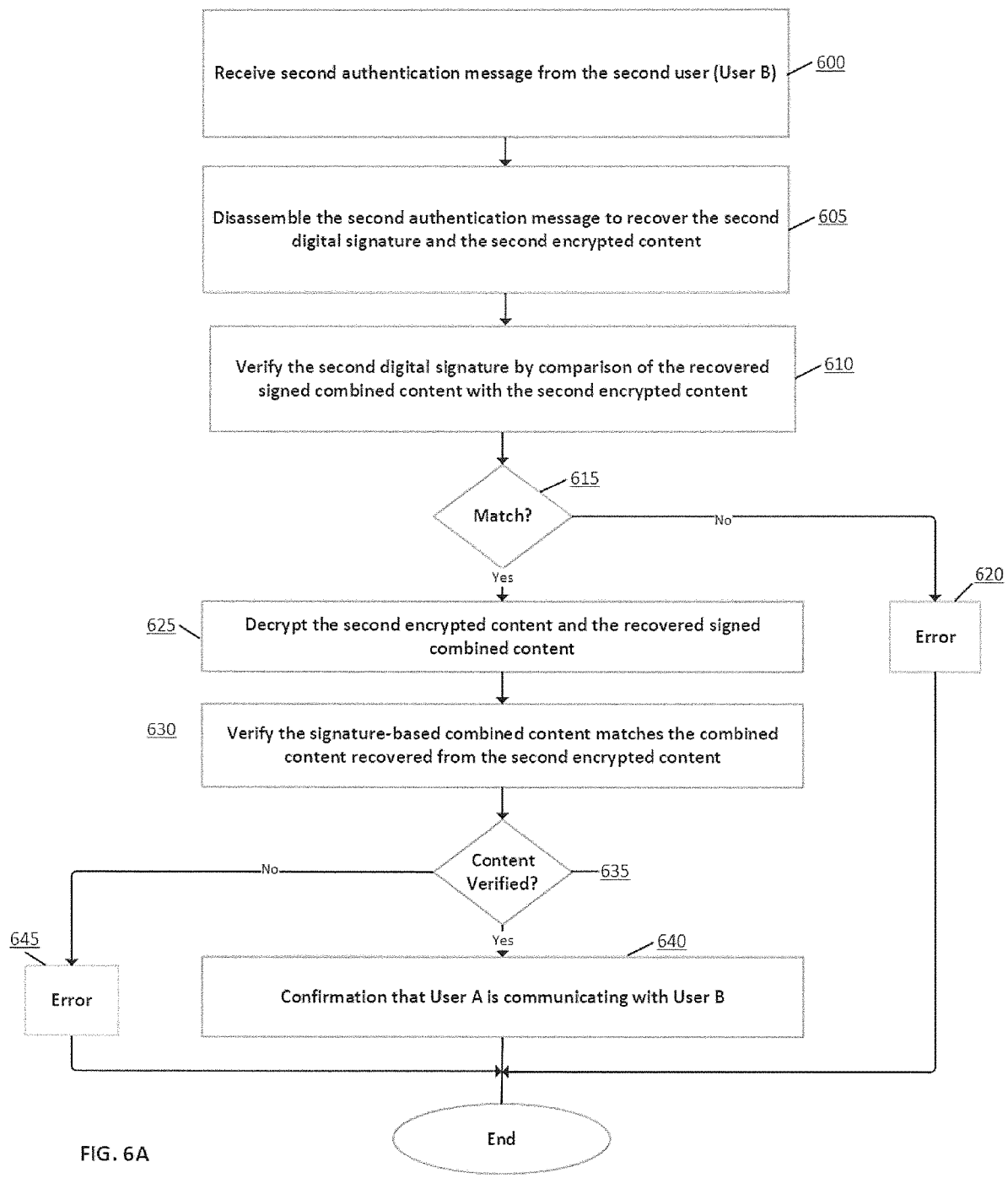
FIG. 6A is an exemplary embodiment of recovery and authentication of the combined content provided in the second cryptographically protected transmission in accordance with the SAIL protocol.
Figure 6B:
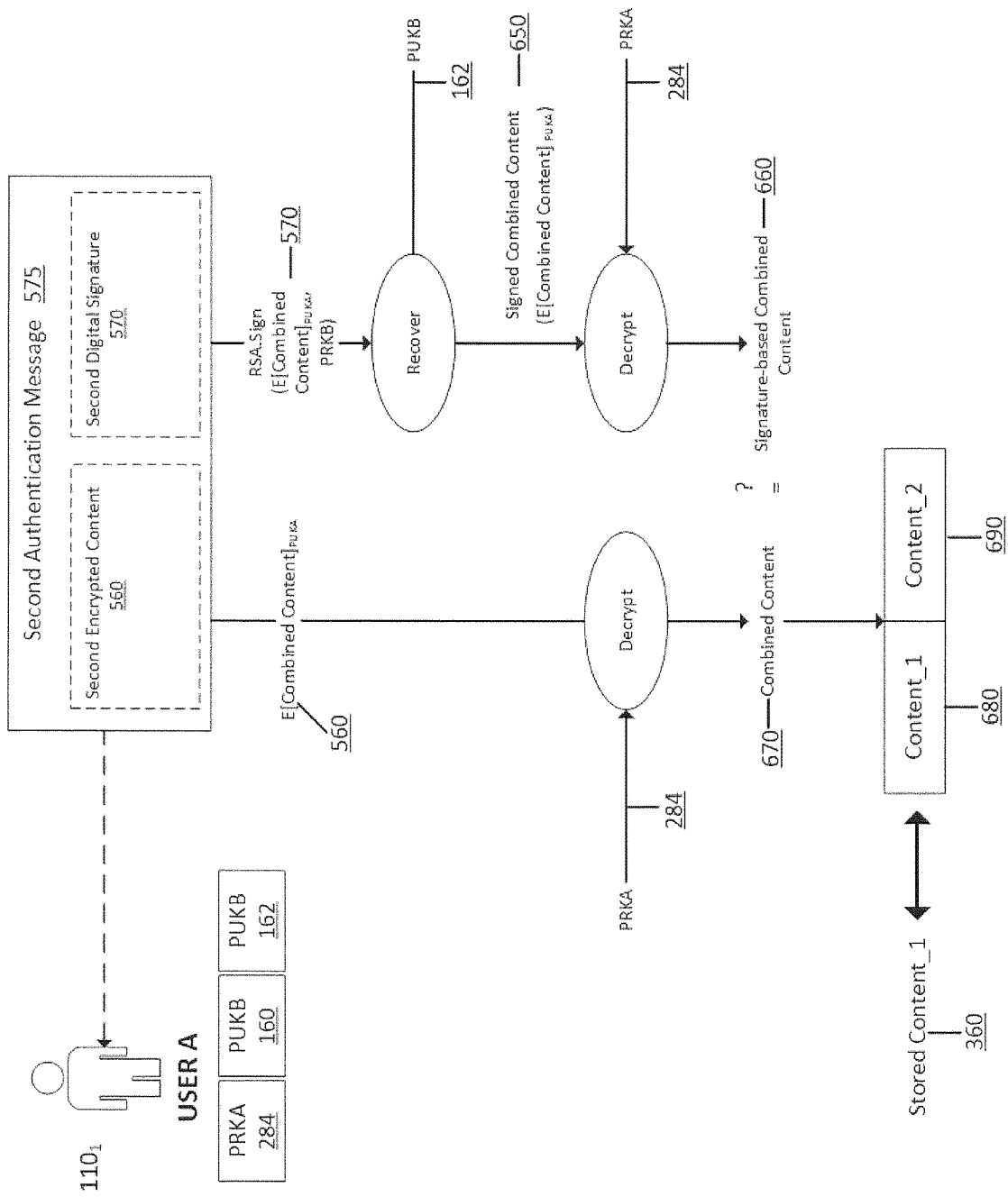
FIG. 6B is an illustrative diagram of the authentication of communications with the receiver based on a presence of a first content recovered from the second cryptographically protected transmission of FIG. 6A.

Referring to FIG. 6A, an exemplary embodiment of recovery and authentication of the combined content 555 provided in the second cryptographically protected transmission 144 in accordance with SAIL is described. Upon receipt of the second authentication message 575 of FIG. 5B, the first user (User A) disassembles the second authentication message to recover the second digital signature and the second encrypted content (blocks 600 and 605). Using a public key of the second user (PUKB), the digital signature logic within the first electronic device verifies the second digital signature by recovering the signed combined content from the digital signature and comparing the signed combined content with the second encrypted content (block 610). If a match is detected, the second encrypted content has not been tampered during transmission. Otherwise, an error condition is detected (blocks 615 and 620).

Upon detecting that the second encrypted content has not been tampered during transmission, the encryption/decryption logic of the first electronic device may be configured to decrypt and verify the accuracy of the combined content by (i) recovering the combined content from the signed combined content included in the digital signature (hereinafter, "signature-based combined content") and the combined content from the second encrypted content and (ii) verifying the signature-based combined content is correlated with the combined content recovered by decrypting the second encrypted content (blocks 625 and 630). Upon verification, the first user (User A) has confirmed that it is, in fact, communicating with the intended receiver, namely User B (blocks 635 and 640). Otherwise, another type of error condition is detected (block 645).

Referring now to FIG. 6B, an illustrative diagram of directed to authentication of the second user based on analysis of the second cryptographically protected transmission 144 in accordance with SAIL is shown. Herein, the second authentication message 575 is received from the second electronic device 110₂ associated with the second user (User B). Thereafter, the digital signature logic within the first electronic device 110₁ is configured to verify the second digital signature 570 by recovering the signed combined content (E[Combined Content]$_{PUKA}$) 650 of the digital signature (RSA.Sign(E[Combined Content]$_{PUKA}$, PRKB)) 570.

Upon receipt of the second authentication message 575, logic within the first electronic device 110₁ disassembles the second authentication message 575 to recover the second encrypted content 560 and the second digital signature 570. Using the public key of the second user (PUKB) 162, the digital signature logic within the first electronic device verifies the second digital signature 570 by recovering the signed combined content 650 from the second digital signature 570. As an optional operation, although not shown, the signed combined content 650 may be compared with the second encrypted content 560. If a match is detected, the second encrypted content 560 has not been tampered during transmission.

Besides the above-described operations by the digital signature logic, the encryption/decryption logic of the first electronic device 110₁ may be configured to decrypt and verify the accuracy of the combined content 555 by decrypting the recovered, signed combined content (E[Combined Content]$_{PUKA}$) 650, included as part of the second digital signature 570, to recover the signature-based combined content 660. Additionally, the encryption/decryption logic of the first electronic device 110₁ may be further configured to decrypt the second encrypted content (E[Combined Content]$_{PUKA}$) 560 to recover the combined content 670. Thereafter, a determination is made whether the correlation between the signature-based combined content 650 and the combined content 670 exceeds a prescribed threshold, and if so, no man-in-the-middle attack has been conducted.

Upon authentication, the cryptographic logic within the first electronic device 110₁ may be further configured to extract the first content 680 from the combined content 670, and thereafter, compare the extracted first content 680 to a stored first content 360. If a match is determined, the second user (User B) is authenticated as, given the first content 360 was encrypted with a public key of the second user (PUKB) 162, only the second user having a corresponding private key (PRKB) 470 could gain access to the first content (content_1) 360. Otherwise, where User B cannot be authenticated, the second encrypted content 560 cannot be decrypted, or a first portion of the combined content (e.g. first content 680) fails to match the first content 360 stored in the first electronic device 110₁ prior to the first cryptographically protected transmission 142, an adversary may have intercepted the second authentication message 575 denoting a man-in-the-middle attack.

Figure 7A:
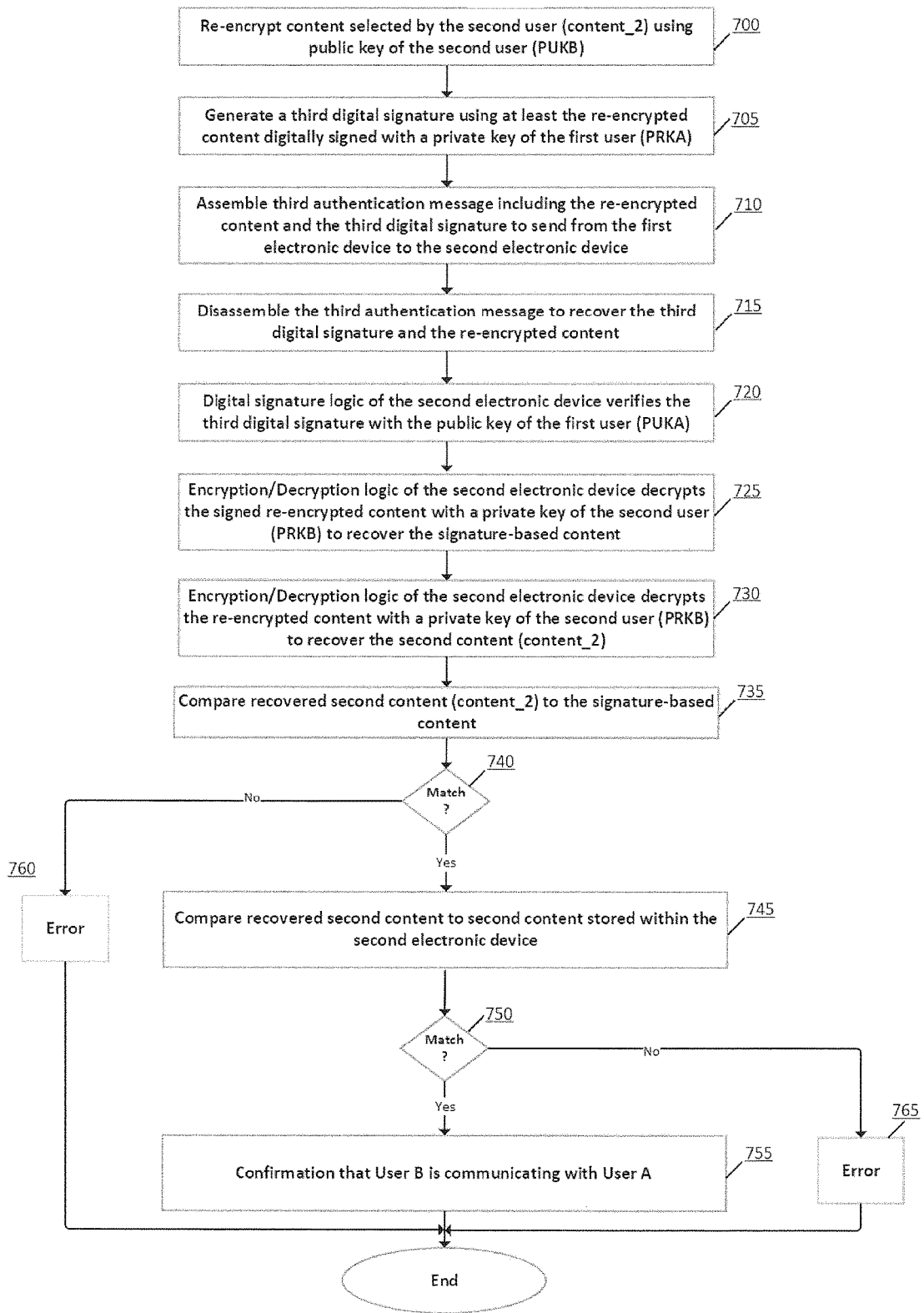
FIG. 7A is an exemplary embodiment of a flowchart of the operations for formulating and processing a third cryptographically protected transmission in accordance with the SAIL protocol.

Referring now to FIG. 7A, an exemplary embodiment of a flowchart of the operations for formulating and processing a third cryptographically protected transmission 146 in accordance with SAIL is described. Initially, content selected and provided as part of the combined content 670 by the second User B (e.g., second content 690, content_2 as shown in FIG. 6B) is re-encrypted using the public key (PUKB) of the second user (User B) to produce re-encrypted content (block 700). Along with the re-encrypted content, a third digital signature is generated using the re-encrypted content (e.g., entire re-encrypted content, a representation of the re-encrypted content such as its hash value, or a portion of the re-encrypted content or its hash value) digitally signed with the private key (PRKA) assigned to User A (block 705). The re-encrypted content and the third digital signature are assembled to form a third authentication message, which is output from the first electronic device to the second electronic device (block 710).

After receipt of the third authentication message as part of the third cryptographically protected transmission, logic within the second electronic device disassembles the third authentication message to retrieve the third digital signature and the re-encrypted content (block 715). Thereafter, the digital signature logic of the second electronic device is configured to verify the third digital signature (block 720). Such verification may be accomplished by recovering the signed re-encrypted content from the third digital signature for comparison to at least a portion of the re-encrypted content.

In response to verification of the third digital signature, the encryption/decryption logic of the second electronic device decrypts the signed re-encrypted content using the private key of User B (PRKB) to recover content therefrom, referred to as "signature-based content" (block 725). Operating with the recovery of the signature-based content, the encryption/decryption logic of the second electronic device further recovers the second content (content_2) from the re-encrypted content provided as part of the third authentication message (block 730). More specifically, the re-encrypted content may be decrypted using the private key of the User B (PRKB) to obtain the second content (content_2).

Thereafter, the second content (content_2) may be compared with the signature-based content, and if there is a match (e.g., a correlation equal to or greater than a prescribed threshold), the content_2 is compared with the stored content_2 for the User B to authenticate that it is in communications with User A (blocks 740-755). If no match for either of these comparisons (blocks 760 and 765), an error condition is detected to denote a potential man-in-the-middle attack or another potential illicit modification of data during transit.

Figure 7B:
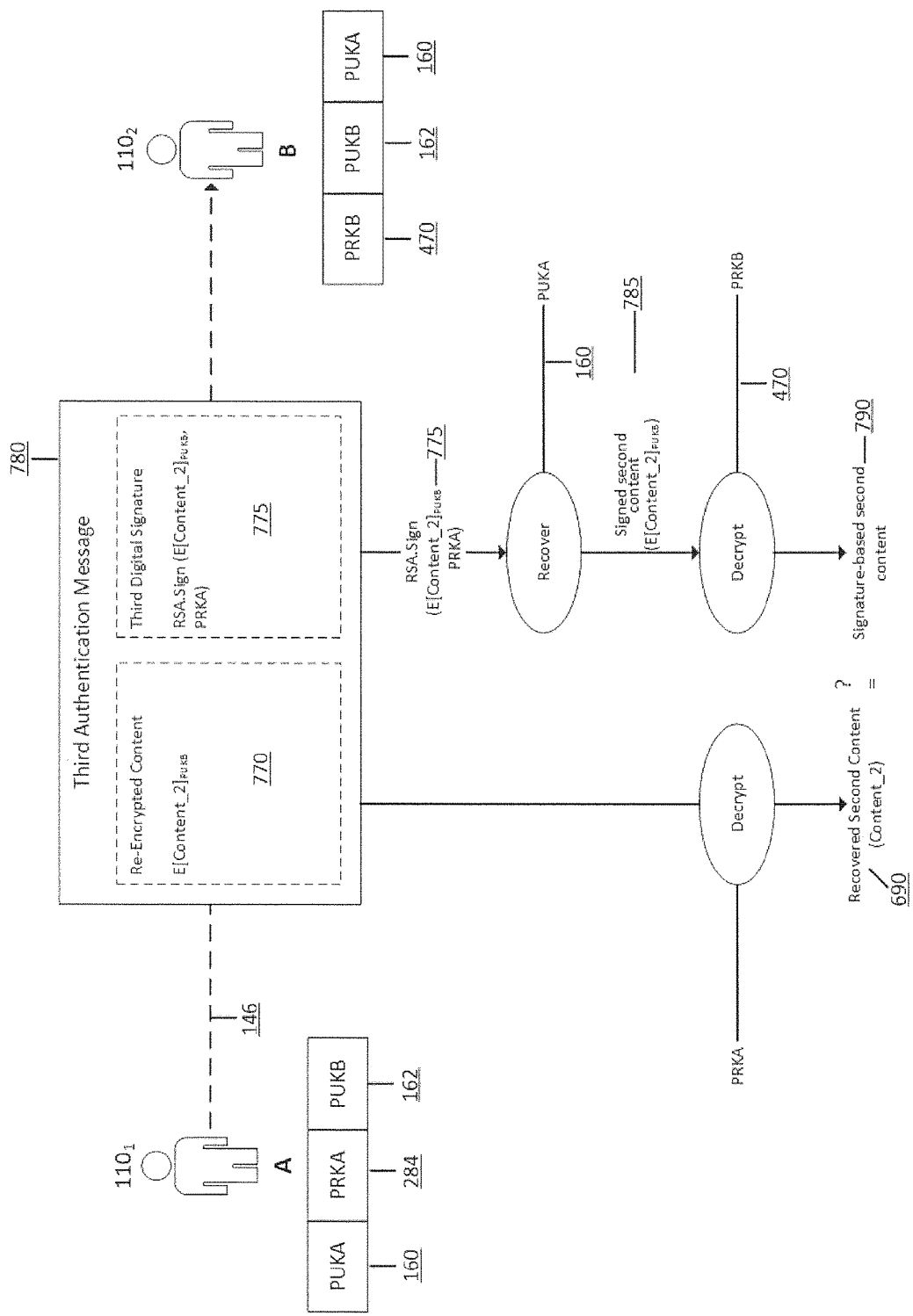
FIG. 7B is an exemplary embodiment of the third cryptographically protected transmission in accordance with the SAIL protocol.

Referring now to FIG. 7B, an exemplary embodiment of the third cryptographically protected transmission 146 in accordance with SAIL is described. Herein, upon receipt and analysis of the combined content, cryptographic logic within the first electronic device $110_1$ extracts the second content (content_2) 690 from the combined content 670 recovered from the second authentication message 575 of FIG. 6B. Thereafter, the cryptographic logic is configured to re-encrypt the second content (content_2) 690 using the public key (PUKB) 162 of the retriever (User B) to produce re-encrypted content 710. The re-encrypted content 770 is illustrated in FIG. 7B as "E[Content_2]$_{PUKB}$."

Along with the re-encrypted content (E[Content_2]$_{PUKB}$) 770, the digital signature logic deployed within the first electronic device $110_1$ is configured to generate a third digital signature 775 including at least the re-encrypted content 710 (e.g., entire re-encrypted content 770, a representation of the re-encrypted content 770 such as its hash value, or a portion of the re-encrypted content 770 or hash value) encrypted with the private key (PRKA) 284 assigned to the first user (User A). The third digital signature 775 is referenced in FIG. 7B as "RSA.Sign(E[Content_2]$_{PUKB}$, PRKA)," may be used to determine whether the re-encrypted content (E[Content_2]$_{PUKB}$) 770 has been tampered during transmission and to extract the recovered second content 690 for analysis. The re-encrypted content 770 and the third digital signature 775 form a third authentication message 780 provided to the second electronic device $110_2$ associated with User B.

After receipt of the third authentication message 780, the digital signature logic within the second electronic device $110_2$ is configured to verify the third digital signature 775 by recovering signed second content (E[Content_2]$_{PUKB}$) 785 from the third digital signature 775. Optionally, the signed second content 785 may be compared to at least a portion of the re-encrypted content 770 to confirm non-tampering of the re-encrypted content 770 during transit.

In the event that the re-encrypted content 770 has not been tampered during transit, the encryption/decryption logic of the second electronic device $110_1$ may decrypt the signed second content (E[Content_2]$_{PUKB}$) 785 using the private key of User B (PRKB) 470 to recover the second content as plaintext from the signed second content included in the third digital signature 775 (hereinafter, "signature-based second content 790"). Additionally, the encryption/decryption logic of the second electronic device $110_2$ may be configured to gain access to and decrypt the re-encrypted content 770 provided by the third authentication message 780 to obtain the second content 690. More specifically, the encryption/decryption logic of the second electronic device $110_1$ decrypts the re-encrypted content (E[Content_2]$_{PUKB}$) 770 using the private key of the User B (PRKB) 470 to obtain the recovered second content (Content_2) 690, which is content that can be traced back to combined content 555 generated by the second electronic device $110_2$ prior to transmission of the second authentication message 575. The second content (content_2) 690 may be compared to the signature-based second content 790, and if there is a match (e.g., a correlation equal to or greater than a prescribed threshold), although not shown, the recovered second content (content_2) 690 may be compared with a stored version of the original second content (content_2) 550. If another match is detected, the second user (User B) has strongly authenticated that it is in communications with the first user (User A).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method that supports Secure Socket Layer (SSL) or Transport Layer Security (TLS) communications with multiple peer-to-peer cryptographically protected transmissions to provide an improved user authentication and key exchange scheme, comprising:

encrypting, by a first electronic device, a first content with a public key of an intended recipient;

generating, by the first electronic device, a first digital signature including at least the first content encrypted with the public key of the intended recipient that is digitally signed with a private key assigned to a sender of a first transmission;

sending, from the first electronic device to a second electronic device, the first transmission including the encrypted first content and the first digital signature, the second electronic device being different from the first electronic device;

receiving, by the first electronic device, a second transmission from the second electronic device, the second transmission including (i) data that comprises at least the first content encrypted with a public key of the sender and (ii) a second digital signature including at least the data encrypted with the public key of the sender that is digitally signed with a private key assigned to the intended recipient;

recovering, by the first electronic device using the private key assigned to the sender, at least the first content from the second transmission;

verifying, by the first electronic device, whether the second transmission originated from the intended recipient upon determining that the first content is part of the data; and generating and sending, by the first electronic device, a third transmission including at least (i) a second content, being a portion of the data remaining after extraction of the first content, encrypted with the public key of the intended recipient and (ii) a third digital signature including at least the second content encrypted with the public key of the intended recipient digitally signed with the private key assigned to the sender of the first transmission and the third digital signature is provided to verify non-tampering of the at least the second content during transit from the first electronic device to the second electronic device.

2. The computerized method of claim 1, wherein the data includes the first content concatenated to the second content selected by the intended recipient.

3. The computerized method of claim 1, wherein the data includes a logical bitwise aggregation of the first content and the second content selected by the intended recipient.

4. The computerized method of claim 2, wherein the third transmission further comprises a symmetric key combined with the second content to produce a combined result and the combined result being encrypted with the public key of the intended recipient.

5. The computerized method of claim 4, wherein the third digital signature including the combined result encrypted with the public key of the intended recipient and digitally signed with the private key assigned to the sender.

6. The computerized method of claim 2, wherein the third transmission further comprises a symmetric key encrypted with the public key of the intended recipient and the third digital signature further includes at least both the symmetric key encrypted with the public key of the intended recipient and the second content encrypted with the public key of the intended recipient digitally signed with the private key assigned to the sender.

7. A computerized method that supports Secure Socket Layer (SSL) or Transport Layer Security (TLS) communications through multiple cryptographically protected transmissions to provide an improved user authentication and key exchange scheme, comprising:

encrypting a first content using a public key of an intended recipient of a first transmission;

generating a first digital signature including information for use in verifying non-tampering of the first content during transit from a first electronic device to a second electronic device, the information being digitally signed using a private key of a sender of the first transmission;

sending the first transmission from the first electronic device to the second electronic device, the first transmission including the encrypted first content and the first digital signature;

receiving a second transmission from the second electronic device by the first electronic device, the second transmission including data that comprises an aggregation of the first content and a second content encrypted with a public key of the sender and a second digital signature including information that is digitally signed using a private key of the intended recipient of the first transmission and is provided to verify non-tampering of the data during transit from the second electronic device to the first electronic device;

recovering the first content from the second transmission;

verifying that the second transmission originated from the intended recipient upon determining that the first content is part of the data; and generating and sending a third transmission including at least (i) the second content encrypted with the public key of the intended recipient and (ii) a third digital signature including information that is digitally signed using the private key of the sender and the third digital signature is provided to verify non-tampering of the at least the second content during transit from the first electronic device to the second electronic device.

8. The computerized method of claim 7, wherein the information of the first digital signature being digitally signed using the private key of the sender includes at least the first content encrypted with the public key of the intended recipient.

9. The computerized method of claim 7, wherein the information of the first digital signature being digitally signed using the private key of the sender includes a hash value of the first content encrypted with the public key of the intended recipient.

10. The computerized method of claim 8, wherein the information of the second digital signature being digitally signed using the private key of the intended recipient includes at least the aggregation of the first content and the second content encrypted with the public key of the sender.

11. The computerized method of claim 10, wherein the aggregation of the first content and the second content includes a concatenation of the first content and the second content.

12. The computerized method of claim 10, wherein the aggregation of the first content and the second content includes a logical bitwise aggregation of the first content and the second content.

13. The computerized method of claim 8, wherein the information of the second digital signature being digitally signed using the private key of the intended recipient includes a hash value of at least the aggregation of the first content and the second content.

14. The computerized method of claim 7, wherein the third transmission further comprises a symmetric key combined with the second content to produce a combined result, the combined content being encrypted with the public key of the intended recipient.

15. The computerized method of claim 14, wherein the third digital signature including the combined result encrypted with the public key of the intended recipient and digitally signed with the private key assigned to the sender.

16. An electronic device comprising:

a processor; and a memory communicatively coupled to the processor, the memory including one or more software module that, upon execution by the processor, perform operations, including:

generating a first message for transmission, the first message includes a first content encrypted with a public key of an intended recipient and a first digital signature including information for use in verifying non-tampering of the first content during transmission, the information being digitally signed using a private key of a sender of the first message;

receiving a second message including data that comprises an aggregation of the first content and a second content encrypted with a public key of the sender and a second digital signature including information for in verifying non-tampering of the data during transmission;

recovering the data from the second message by at least decrypting the aggregation of the first content and the second content encrypted with the public key of the sender using a private key of the sender;

verifying, based on the first content being part of the data, that the second message originated from the intended recipient; and generating a third message for transmission, the third message includes at least (i) the second content encrypted with the public key of the intended recipient and (ii) a third digital signature including information that is digitally signed using the private key of the sender and the third digital signature is provided to verify non-tampering of the at least the second content during transmission.

* * * * *